United States Patent
Graetz et al.

(10) Patent No.: US 12,030,676 B1
(45) Date of Patent: Jul. 9, 2024

(54) HYDRIDE FORMING OF SHEET MATERIALS

(71) Applicant: HRL LABORATORIES, LLC, Malibu, CA (US)

(72) Inventors: Jason A. Graetz, Malibu, CA (US); John J. Vajo, Malibu, CA (US); Christopher P. Henry, Malibu, CA (US); Adam E. Sorensen, Malibu, CA (US); Geoffrey P. Mcknight, Malibu, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 0 days.

(21) Appl. No.: 17/451,993

(22) Filed: Oct. 22, 2021

Related U.S. Application Data

(60) Provisional application No. 63/178,448, filed on Apr. 22, 2021.

(51) Int. Cl.
*B32B 15/20* (2006.01)
*B32B 1/08* (2006.01)
(Continued)

(52) U.S. Cl.
CPC .................. *B64G 1/66* (2013.01); *B32B 1/08* (2013.01); *B32B 15/08* (2013.01); *B32B 15/20* (2013.01);
(Continued)

(58) Field of Classification Search
CPC .. B32B 1/02; B32B 1/08; B32B 15/20; B64G 2001/224; Y10T 428/13
(Continued)

(56) References Cited

U.S. PATENT DOCUMENTS 2,730,626 A * 1/1956 Varney ...................... G01T 7/02
340/870.1
2,767,501 A * 10/1956 Bjorksten .............. A01K 73/12
43/7
(Continued)

FOREIGN PATENT DOCUMENTS

| CA | 2 613 563 A1 | 1/2007 | |
| WO | WO-2013057588 A2 * | 4/2013 | ............ B29C 39/02 |
| WO | WO-2018185477 A1 * | 10/2018 | ................. F41J 2/00 |

OTHER PUBLICATIONS

"Mylar® Polyester Films", Tekra, 2022, accessed online Oct. 25, 2022, https://www.tekra.com/products/brands/dupont-teijin-films/mylar (Year: 2022).*
(Continued)

*Primary Examiner* — Michael C Romanowski
(74) *Attorney, Agent, or Firm* — Lewis Roca Rothgerber Christie LLP

(57) ABSTRACT

A deployable structure includes a hydride material to be converted into hydrogen gas; and a sheet material encapsulating the hydride material; wherein the sheet material is to be plastically deformed by the hydrogen gas to have an expanded structure. A method of manufacturing a deployable structure includes: forming a sheet material comprising an outer shell structure and a hollow interior; placing a hydride material capable of being converted into hydrogen gas into the hollow interior; sealing the outer shell structure; and converting and releasing the hydrogen gas to expand and plastically deform the sheet material.

12 Claims, 10 Drawing Sheets

(51) Int. Cl.
  *B32B 15/08* (2006.01)
  *B64G 1/66* (2006.01)
  *B64G 1/22* (2006.01)
(52) U.S. Cl.
  CPC .... *B32B 2307/7242* (2013.01); *B64G 1/2227* (2023.08); *Y10T 428/1328* (2015.01); *Y10T 428/1334* (2015.01); *Y10T 428/1338* (2015.01); *Y10T 428/1355* (2015.01); *Y10T 428/1359* (2015.01)
(58) Field of Classification Search
  USPC ................. 428/34.1–36.92; 383/3; 229/5.82
  See application file for complete search history.

(56) References Cited

U.S. PATENT DOCUMENTS

| | | | | |
|---|---|---|---|---|
| 2,996,212 | A * | 8/1961 | O'Sullivan, Jr. | B64B 1/58 244/158.3 |
| 3,004,735 | A * | 10/1961 | Kinard | B64G 1/52 250/389 |
| 3,163,209 | A * | 12/1964 | Shinn | B64G 1/50 165/145 |
| 3,176,933 | A * | 4/1965 | Clemmons, Jr. | F24S 50/80 244/158.3 |
| 3,220,004 | A * | 11/1965 | Gillespie, Jr. | H01Q 15/163 244/158.3 |
| 3,228,633 | A * | 1/1966 | Fisher | B64D 1/02 244/31 |
| 3,369,774 | A * | 2/1968 | Struble, Jr. | B64B 1/58 428/401 |
| 3,566,426 | A * | 3/1971 | Davidson | B63C 7/10 114/244 |
| 3,664,401 | A * | 5/1972 | Trovati | A63B 41/00 156/290 |
| 3,929,425 | A * | 12/1975 | Valdo | F28F 9/262 52/630 |
| 3,981,753 | A * | 9/1976 | Hopper | B23K 35/224 148/26 |
| 4,134,491 | A * | 1/1979 | Turillon | F17C 11/005 220/88.1 |
| 4,166,598 | A * | 9/1979 | Seifert | B64G 1/58 244/159.2 |
| 4,282,931 | A | 8/1981 | Golben | |
| 4,361,297 | A * | 11/1982 | Pommereau | B64B 1/58 244/31 |
| 4,377,209 | A | 3/1983 | Golben | |
| 4,385,494 | A | 5/1983 | Golben | |
| 4,457,136 | A * | 7/1984 | Nishizaki | C01B 3/0036 165/104.12 |
| 4,582,734 | A * | 4/1986 | Miller | B64D 25/14 428/920 |
| 4,615,455 | A * | 10/1986 | Tansill | B60K 15/03 220/88.1 |
| 4,671,975 | A * | 6/1987 | Smialowicz | B64D 25/14 428/323 |
| 5,641,135 | A * | 6/1997 | Stuart | B64G 1/1085 244/172.6 |
| 5,813,454 | A * | 9/1998 | Potter | F28F 13/00 165/96 |
| 5,944,282 | A * | 8/1999 | Clausnitzer | B64D 1/14 244/101 |
| 6,264,144 | B1 * | 7/2001 | Thornton | B64G 1/58 244/113 |
| 6,405,532 | B1 | 6/2002 | Shahinpoor et al. | |
| 6,589,312 | B1 * | 7/2003 | Snow | C01B 3/0031 977/948 |
| 6,730,212 | B1 * | 5/2004 | Yamagishi | G01N 27/126 204/403.01 |
| 7,938,254 | B1 * | 5/2011 | Vajo | C01B 3/0084 423/658.2 |
| 8,240,602 | B1 * | 8/2012 | Lloyd | B64B 1/68 244/31 |
| 8,575,891 | B2 * | 11/2013 | Sheahan, Jr. | H01M 10/441 320/107 |
| 10,297,848 | B1 * | 5/2019 | Graetz | C01B 3/04 |
| 10,661,878 | B1 * | 5/2020 | Bonang | B64U 70/50 |
| 11,312,466 | B1 * | 4/2022 | Slocum | B64B 1/62 |
| 11,591,050 | B2 * | 2/2023 | Graham | G10K 11/006 |
| 11,858,809 | B2 * | 1/2024 | Zhao | F28D 1/0316 |
| 2002/0026794 | A1 * | 3/2002 | Shahinpoor | A61F 2/08 623/24 |
| 2003/0159829 | A1 | 8/2003 | Fripp et al. | |
| 2004/0021037 | A1 * | 2/2004 | Nachbar | B64B 1/02 244/125 |
| 2005/0035003 | A1 * | 2/2005 | Kelley | H01M 8/04216 206/0.7 |
| 2005/0123639 | A1 * | 6/2005 | Ring | F16L 13/166 264/130 |
| 2005/0211573 | A1 * | 9/2005 | Myasnikov | C01B 3/0005 220/4.12 |
| 2007/0025908 | A1 * | 2/2007 | Sandrock | C01B 6/06 423/644 |
| 2007/0089764 | A1 * | 4/2007 | Klassen | F17C 1/16 134/108 |
| 2007/0181440 | A1 * | 8/2007 | Streich | F03D 9/25 205/637 |
| 2008/0187798 | A1 * | 8/2008 | McLean | H01M 8/2475 429/444 |
| 2008/0272130 | A1 * | 11/2008 | Abdel-Baset | C01B 3/0026 220/586 |
| 2009/0140510 | A1 * | 6/2009 | Mendenhall | C06B 21/0083 280/741 |
| 2009/0324452 | A1 * | 12/2009 | Salinas | B01J 4/02 422/162 |
| 2010/0150824 | A1 * | 6/2010 | Withers-Kirby | F17C 11/005 422/164 |
| 2010/0282115 | A1 * | 11/2010 | Sheridan | F42B 12/36 102/491 |
| 2012/0273622 | A1 * | 11/2012 | Long | G21F 7/00 244/171.7 |
| 2014/0134354 | A1 * | 5/2014 | Mazany | D06N 3/0063 442/72 |
| 2017/0057635 | A1 * | 3/2017 | Strayer | B64C 39/024 |
| 2017/0107101 | A1 * | 4/2017 | Tegel | B01J 7/02 |
| 2017/0355462 | A1 * | 12/2017 | Hoheisel | B64B 1/64 |
| 2019/0006686 | A1 * | 1/2019 | Carralero | H01M 8/04014 |
| 2019/0252592 | A1 * | 8/2019 | Hiller | H10N 10/13 |
| 2020/0231265 | A1 * | 7/2020 | Bognar | B64B 1/62 |
| 2021/0114870 | A1 * | 4/2021 | Bognar | C01B 3/22 |
| 2021/0155477 | A1 * | 5/2021 | Halsey | H01M 8/0643 |
| 2021/0292159 | A1 * | 9/2021 | Zhao | F28F 21/081 |
| 2022/0033112 | A1 * | 2/2022 | Bognar | B64G 1/222 |
| 2022/0363536 | A1 * | 11/2022 | Gonfard | C01B 3/065 |
| 2024/0044626 | A1 * | 2/2024 | Skorczewski | F42B 12/70 |

OTHER PUBLICATIONS

"Choosing the Proper Electrical Insulating Material for Mission-Critical Applications", Roy Orstad, accessed online Oct. 26, 2022, http://www-eng.lbl.gov/~shuman/NEXT/CURRENT_DESIGN/TP/MATERIALS/elect_insulating_films_overview.pdf (Year: 2022).*
Graetz. J., "New approaches to hydrogen storage," *Chemical Society Reviews*, 2009, vol. 38, pp. 73-82.
Graetz, J., "Metastable Metal Hydrides for Hydrogen Storage," *ISRN Materials Science*, vol. 2012, Article ID 863025, 19 pages, copyright 2012.

* cited by examiner

HYDRIDE FORMING OF SHEET MATERIALS

CROSS-REFERENCE TO RELATED APPLICATION(S)

This application claims priority to and the benefit of U.S. Provisional Application No. 63/178,448, filed Apr. 22, 2021 and titled "HYDRIDE FORMING OF SHEET MATERIALS," the entire content of which is incorporated herein by reference.

BACKGROUND

1. Field

One or more aspects of embodiments of the present disclosure relate to a self-forming device utilizing metal hydrides for use in mass-efficient deployable structures and architectures, including those used in space applications; and methods of deploying such self-forming devices.

2. Description of Related Art

Deployable devices and structures are designed to be capable of large-scale geometric and configurational changes, often associated with a large differential in volume and size, which proceed autonomously after being triggered. Deployable design may be particularly advantageous when volume, mass, and size limitations make transport difficult or prohibitive, and/or when rapid assembly/disassembly (on the order of minutes to hours) is desired. Innovative deployable structures having increased durability, mass efficiency, and/or adaptability are desired.

Metal hydride compounds capable of releasing hydrogen gas have been explored as a gas source (means) for inflating deployable structures. Metal hydrides are highly mass and volume efficient, and may provide high specific energies and energy densities.

SUMMARY

One or more aspects of embodiments of the present disclosure are directed toward a deployable structure utilizing a hydride material as a source of hydrogen gas for inflation and/or plastic deformation. Additional aspects of embodiments of the present disclosure are directed toward a method of manufacturing and/or operating such a deployable structure.

One or more embodiments of the present disclosure provide a deployable structure including a hydride material to be converted into hydrogen gas; and a sheet material encapsulating the hydride material, wherein the sheet material is to be plastically deformed by the hydrogen gas to have an expanded structure.

In some embodiments, the hydride material may be or include a reversible hydride. In some embodiments, the hydride material may be or include an irreversible hydride.

In some embodiments, the sheet material may include: a pressure holding layer, a plastic deformation layer outside the pressure holding layer, and an optional hydrogen barrier layer inside the plastic deformation layer. In some embodiments, two or more selected from the hydrogen barrier layer, the pressure holding layer, and the plastic deformation layer may be integrated as the same layer.

In some embodiments, the plastic deformation layer may include a metal including aluminum, titanium, iron, copper, beryllium, magnesium, nickel, or an alloy or mixture of any thereof.

In some embodiments, the hydrogen barrier layer may include a substantially continuous aluminum layer or coating.

In some embodiments, the plastic deformation layer may include a thermoplastic-fiber composite, a thermoset-fiber composite, and/or a b-staged thermosetting composite.

In some embodiments, the pressure holding layer may include a polymer material.

In some embodiments, a temperature at which the hydride material is to be converted into hydrogen gas may be matched with a plastic deformation or glass transition temperature of the plastic deformation layer.

In some embodiments, the sheet material may include an aluminum film as the pressure holding layer and the plastic deformation layer, and the hydrogen barrier layer may be omitted.

In some embodiments, the deployable structure may further include a trigger in contact with the hydride material. The trigger may include at least one selected from a thermal trigger, a chemical trigger, and an electrical trigger. In some embodiments, the thermal trigger may include a heat-generating coating on a surface of the sheet material to generate and apply heat to the hydride material.

In some embodiments, the deployable structure may further include a female die surrounding the sheet material to determine one or more contours of the sheet material in the expanded structure.

One or more embodiments of the present disclosure provide a method of manufacturing and/or operating a deployable structure, the method including: providing a sheet material comprising an outer shell structure and a hollow interior; placing a hydride material to be converted into hydrogen gas into the hollow interior; sealing the outer shell structure; and converting and releasing the hydrogen gas to expand and plastically deform the sheet material.

In some embodiments, the method may further include applying a trigger to the hydride material to release the hydrogen gas. In some embodiments, the act of applying the trigger may include applying heat to the hydride material at a temperature of about 40° C. to about 500° C.

In some embodiments, the hydride material may be or include a reversible hydride, such that the act of converting and releasing the hydrogen gas is reversible and includes controlling the temperature of the hydride material.

In some embodiments, the hydride material may include an irreversible hydride, such that the act of converting and releasing the hydrogen gas is irreversible.

In some embodiments, the act of plastically deforming the sheet material may further include hardening the sheet material during and/or after the expanding of the sheet material, and the act of converting and releasing the hydrogen gas may be configured to occur at a faster rate (e.g., may be faster) than the act of hardening the sheet material.

In some embodiments, the act of converting and releasing the hydrogen gas may generate a pressure greater than the yield stress of the sheet material and less than the degradation or failure stress of the sheet material.

BRIEF DESCRIPTION OF THE DRAWINGS

The features and advantages of embodiments of the present disclosure will be better understood by reference to the following detailed description when considered in conjunction with the accompanying drawings.

DETAILED DESCRIPTION

Figure 1:
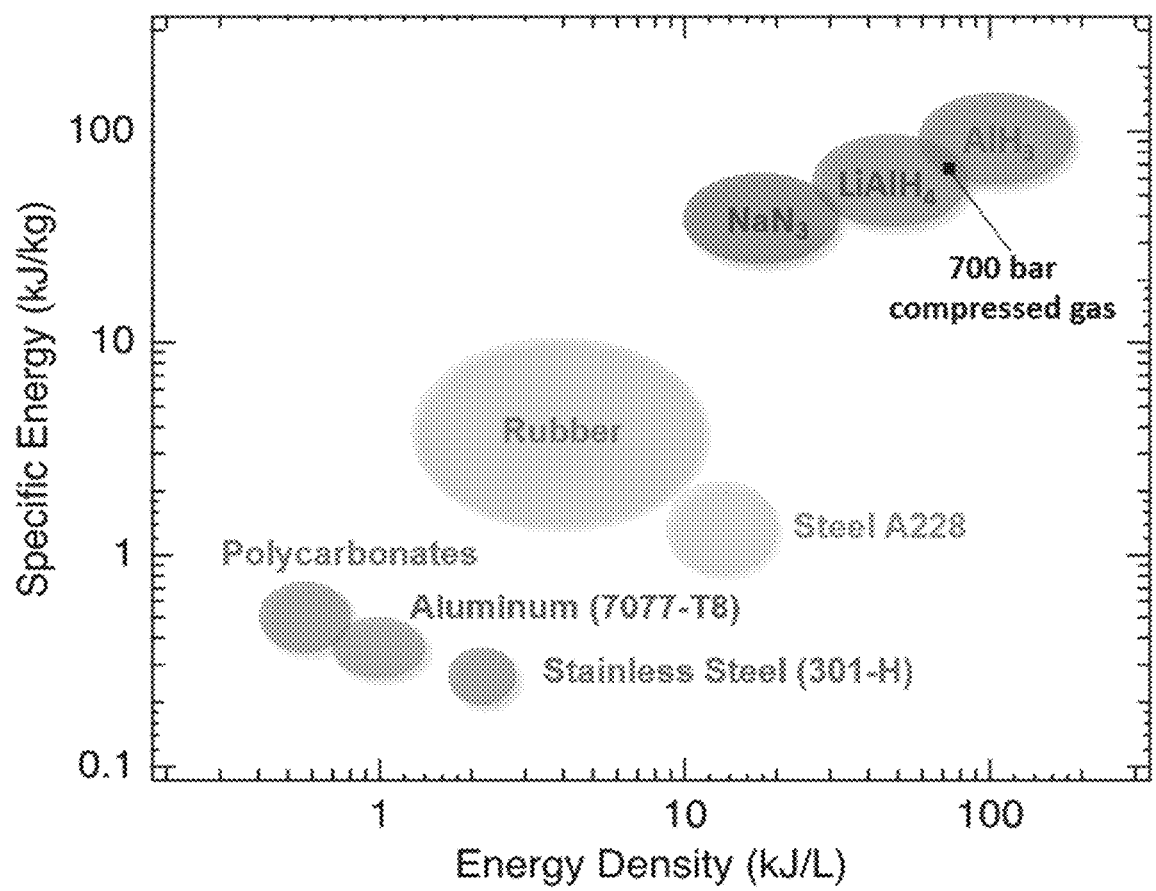
FIG. 1 is a plot of specific energy vs. energy density for a variety of energy storage materials.

The following description sets forth various example embodiments and details in order to provide a more thorough understanding of the present disclosure. However, the subject matter of the present disclosure may be embodied in many different forms, and is not limited to the embodiments and details set forth herein. All disclosed features may be replaced with comparable features serving the same, equivalent, or similar purpose, unless expressly stated otherwise. Features of one embodiment may be incorporated into other embodiments unless expressly stated otherwise.

In the drawings, the same or similar reference numerals refer to the same or similar elements throughout, and duplicative descriptions thereof may not be provided. The drawings are not necessarily drawn to scale, and thicknesses and dimensions of elements may be exaggerated for clarity.

Unless otherwise defined, all chemical names, technical and scientific terms, and terms defined in common dictionaries should be interpreted as having meanings consistent with the context of the related art, and should not be interpreted in an ideal or overly formal sense. The term "may" will be understood to refer to "one or more embodiments," some of which include the described element and some of which exclude that element and/or include an alternate element. Similarly, alternative language such as "or" refers to multiple embodiments, each including a corresponding listed item.

Any claim element that does not explicitly recite a "means for" or "step for" in performing a function, is not to be interpreted as a "means" or "step" clause under 35 U.S.C. § 112(f). The use of "step of" or "act of" in the claims herein is not intended to invoke the provisions of 35 U.S.C. § 112(f).

It will be understood that when an element (e.g., layer) is referred to as being "outside," "inside," "on," "above," "below," "connected to," or "coupled to" another element, it may be in direct contact with the other element, or one or more intervening elements may be present. In contrast, when an element (e.g., layer) is referred to as being "directly" on, above, below, etc. another element, no intervening elements are present. Terms describing spatial relationships between elements or features (such as "below," "lower," "under," "above," "upper," etc.) should be interpreted in the context of the device as a whole. For example, an element described as being "under" a second element could be alternatively described as being "above" the second element in an alternative orientation, when such orientation is available.

Aspects of embodiments of the present disclosure are directed toward a deployable structure (deployable device) including a hydride material as an agent for controllably releasing hydrogen gas (H 2) into a sealed encapsulating sheet material, which is subsequently plastically deformed by the increase in pressure. Additional aspects of the present disclosure are directed toward a method of using the hydride material as a mass- and volume-efficient source of pressure for plastic deforming, for example to deploy a sealed, hollow structure. The plastically deformed sheet material may be configured to retain its shape and volume without continuous internal pressurization, and can be assembled into larger hierarchical structures. This approach enables a highly distributed gas generation system in which the energy used to deploy the structure (E=PV, where E is energy, P is pressure, and V is volume) is chemically stored at low pressure and is capable of controllably generating high pressures at specific locations throughout the structure.

Related art deployable structures have typically been actuated or unfurled using mechanical energy (such as the elastic energy stored in a spring) or by using the pressure of a compressed gas. Mechanical actuation tends to suffer from low energy densities, while compressed gas systems are limited by the need for high pressure plumbing and valving structures that add to weight and scale (size). In contrast, the use of chemically stored energy (e.g., solid chemicals capable of producing gas) according to embodiments of the present disclosure provides for high energy density and high "inherent" gas pressures stored at low initial pressure, thereby enabling production and deployment of more mass- and volume-efficient structures based on gas pressurization.

FIG. 1, which is a plot of specific energy vs. energy density for a variety of energy storage materials, shows that $NaN_3$ (e.g., azide) and the hydride materials $LiAlH_4$ and $AlH_3$ (discussed below) provide chemically stored energy with superior specific energy and energy density compared to the materials providing elastically (Hookean) stored energy in the bottom half of the plot. For example, 1 cm 3 (1.49 g) of aluminum hydride (alane, $AlH_3$) can provide up to 1670 cm 3 of $H_2$ at standard temperature and pressure (STP), which gives a stored energy of 169 kJ/L (113 kJ/kg). This energy can generate pressures up to 24,000 psi. The calculated data in FIG. 1 reflects the energy released as useful work (PAV), does not include any endothermic or exothermic component associated with the gas-producing reaction, and assumes a 50% packing density for powders of the chemically stored energy.

The term "plastically deformed" (or "plastically formed" or "plastically worked") refers to permanent distortion (such as bending and/or elongation) that occurs when a material is subjected to mechanical stresses that exceed its yield strength. In embodiments of the present disclosure, mechanical stresses are applied to the inside surface (inner cavity) of an encapsulating sheet material structure via the force of pressurized gas. The structure may also be inflated, extended, and/or unfolded during plastic deformation of the sheet material membrane, and the resulting shape and volume of the sheet material structure may be retained even when the structure is depressurized. As used herein, plastic deformation is to be contrasted with and interpreted as being different from elastic deformation, in which any change to the shape of e.g., a sheet material is temporary and self-reversing (e.g., the reversal occurs without additional energy input) once the gas pressure is decreased, due to elastic restoring forces within the material.

One or more aspects of embodiments of the present disclosure provide for a deployable structure (deployable device) including a hydride material to be converted into hydrogen gas; and a sheet material encapsulating the hydride material, wherein the sheet material is configured to be plastically deformed by the hydrogen gas to have an expanded structure. Stated another way, the sheet material may be configured to have an expanded structure in response to being plastically deformed by the hydrogen gas.

Hydride Material

The hydride material may be or include any suitable compound or mixture of compounds having one or more hydride functional groups (e.g., —H) capable of participating in suitable chemical reaction(s), such as disproportionation/decomposition, to release $H_2$. In some embodiments, as described below, the hydride functional groups may be in equilibrium with $H_2$ gas. The reaction(s) may proceed through thermolysis, hydrolysis, or any suitable mechanism. The hydride material may be a stable hydride or a metastable hydride at a given temperature (e.g., at room temperature or STP).

In the stable hydride, $H_2$ may be released through endothermic thermolysis, e.g., when the system temperature is increased to the point where the equilibrium hydrogen pressure exceeds the external hydrogen partial pressure. In some cases, the endothermic decomposition reaction can be reversed and the hydride re-charged or re-formed (to at least a partial degree) by simply lowering the temperature and/or by raising the external hydrogen pressure to drive the hydrogen gas back into the hydride material. For example, the hydride may be a reversible (e.g., rechargeable) hydride, where the hydride groups are in equilibrium with $H_2$, and the amount (partial pressure) of $H_2$ at any given time (e.g., the position of the equilibrium) may be selected by controlling various parameters such as the applied temperature, according to Le Chatelier's principle.

In contrast, a metastable hydride is thermodynamically unstable, but kinetically stabilized (e.g., has a low rate of decomposition at room temperature even though the overall reaction is thermodynamically favorable). Compared to stable hydrides, metastable hydrides typically require lower temperature inputs to release hydrogen. The metastable hydride may be slightly endothermic (requiring a small amount of heat to decompose the hydride), or exothermic (where heat is released during decomposition). Separately, the metastable hydride may be a reversible hydride or an irreversible hydride.

Detailed descriptions of various suitable hydride materials, their compositions, and hydrogen gas release mechanisms can be found in e.g., Graetz, J., "New approaches to hydrogen storage," *Chem. Soc. Rev.*, 2009, 38, pages 73-82; and Graetz, J., "Metastable Metal Hydrides for Hydrogen Storage," *ISRN Mater. Sci.*, 201, Article ID. 863025, pages 1-18, the entire content of each of which is incorporated herein by reference.

In some embodiments, the hydride material may be or include an irreversible (non-reversible) hydride, in which the released $H_2$ cannot be easily re-converted into a hydride material via the reverse reaction. Examples of the irreversible hydride may include $LiAlH_4$, $AlH_3$, $Li_3AlH_6$, $NaBH_4$, $Mg(AlH_4)_2$, $Ca(AlH_4)_2$, ammonia borane ($NH_3BH_3$), and mixtures thereof. For example, the irreversible hydride may be an irreversible alanate, such as $LiAlH_4$, $AlH_3$, $Li_3AlH_6$, $NaBH_4$, $Mg(AlH_4)_2$, and/or $Ca(AlH_4)_2$.

In some embodiments, the hydride material may be or include a reversible hydride. Examples of the reversible hydride may include alanates selected from $NaAlH_4$, $Na_3AlH_6$, $Na_2LiAlH_6$, $KAlH_4$, $K_3AlH_6$, $K_2LiAlH_6$, and $K_2NaAlH_6$, borohydrides selected from $LiBH_4$, and $Mg(BH_4)_2$, amides selected from $LiNH_2$ and $Mg(NH_2)_2$) in combination with lithium hydride (LiH), TiHX, FeTiHX, $MgH_2$, $LaNi_5HX$, $VH_2$, and mixtures thereof.

In some embodiments, the hydride material may have a reversibility that is not yet fully characterized. In some embodiments, the hydride material may be or include any alanate, e.g., an irreversible or reversible alanate as described above or an alanate having unclear reversibility. Examples of the alanate may include those listed above, $LiMg(AlH_4)_3$, $Be(AlH_4)_2$, $Ca(AlH_4)_2$, $CaMg(AlH_4)_3$, $CuAlH_4$, $AgAlH_4$, $Mn(AlH_4)_2$, $Fe(AlH_4)_2$, $Ti(AlH_4)_4$, $In(AlH_4)_3$, $Ce(AlH_4)_3$, and $Sn(AlH_4)_4$. In some embodiments, the hydride material may be or include any borohydride, e.g., an irreversible or reversible borohydride as described above or an borohydride having unclear reversibility. Examples of the borohydride may include those listed above, $Ca(BH_4)_2$, $Zr(BH_4)_4$, and $Zn(BH_4)_2$.

The irreversible hydride may be particularly suitable for a simplified deployment process, in which $H_2$ release is initiated by a simple trigger (described in more detail below) and the resulting pressure can be maintained without having to carefully dial in and control the applied temperature. In contrast, the reversible hydride may provide for greater design flexibility, enabled by the ability to generate controlled amounts (volumes) of $H_2$ at carefully tailored (e.g., varying) rates. As a trade-off, such design flexibility would likely require more complex control of system temperature, and/or additional structural complexity to maintain $H_2$ pressure (e.g., by isolating the hydride from $H_2$).

In some embodiments, the hydride material may be or include $LiAlH_4$ and/or $AlH_3$. The $AlH_3$ may be present as any polymorph (e.g., α, α', β, γ, δ, or ε), and in some embodiments may be α-$AlH_3$.

Figure 2:
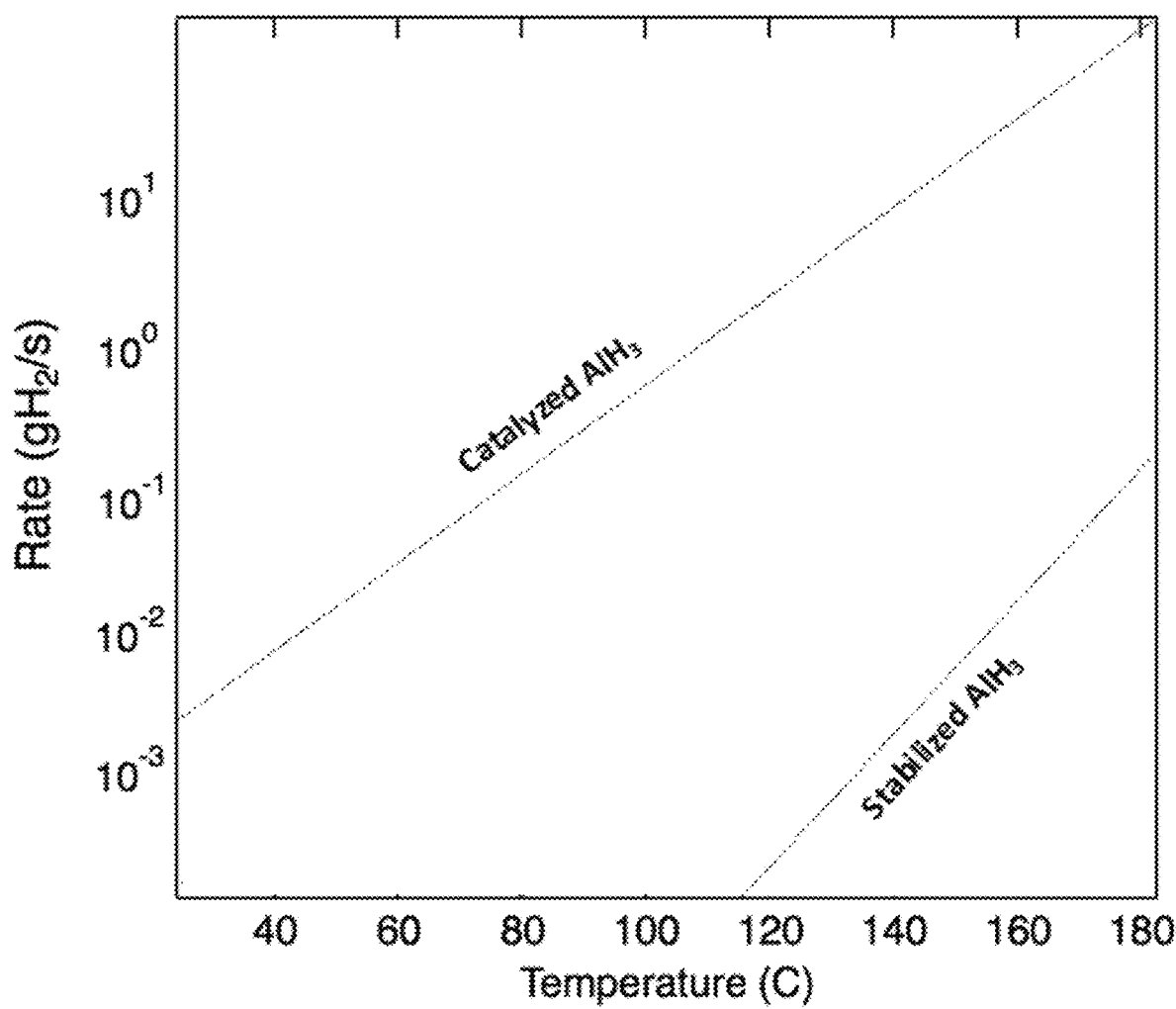
FIG. 2 is a plot comparing the temperature-dependent rates of $H_2$ release by stabilized $AlH_3$ (without a catalyst) and catalyzed $AlH_3$ (mixed with 10 ppm Ti).

In some embodiments, the hydride material may further include a catalyst for reducing the activation barrier associated with $H_2$ desorption (release), for example to enhance the $H_2$ desorption rate at low temperatures (e.g., temperatures from about 30° C. to 140° C.) and/or decrease the temperature needed for a desired rate of $H_2$ desorption. As an example, FIG. 2 is a plot comparing the temperature-dependent rates of $H_2$ release by stabilized $AlH_3$ (without a catalyst) and catalyzed $AlH_3$ (mixed with 10 ppm Ti). Here, the addition of the $TiCl_3$ catalyst results in increased $H_2$ release rates at all temperatures, and in particular, onset of observable $H_2$ release rates at a much lower temperature.

Any catalyst suitable for lowering the activation barrier for $H_2$ release from hydrides (as well as the reverse reaction to form hydrides from $H_2$) may be used. Examples of the catalyst may include $TiF_3$, $TiCl_3$, $TiCl_3 \cdot 1/3AlCl_3$, $VCl_3$, $LaCl_3$, $NbF_5$, $VBr_3$, $AlCl_3$, $NiCl_2$, nanoscale Fe and Ni, TiC, carbon fibers, and mixtures thereof. The catalyst may be provided in any suitable amount for attaining the desired desorption rate and temperature, and for example, may be present in an amount of about $10^{-3}$ mol % to about 5 mol % based on the total amount of the hydride material, for example, about $10^{-2}$ mol % to about 4 mol %, 0.1 mol % to about 3 mol %, or about 1 mol % to about 2 mol %.

The kinetics (rate) of $H_2$ release from the hydride material may be affected by various parameters, including particle size, particle morphology, and the degree of mixing between hydride material and catalyst. Those having ordinary skill in the art are capable of selecting such parameters or modifying the hydride material in order to attain a desired rate of release. In some embodiments, for example, particles of the hydride material may be surface treated to form an oxide surface or other passivation layer.

The hydride material may be provided in any suitable physical format to facilitate its inclusion in the interior of the deployable structure. In some embodiments, the hydride material may be provided as a loose powder, and in some embodiments, the hydride material may be pressed into larger particles or pellets. The hydride material may be provided directly to the interior, or may be held in a secondary containment structure, such as a bag configured to break open under hydrogen release.

Figure 3:
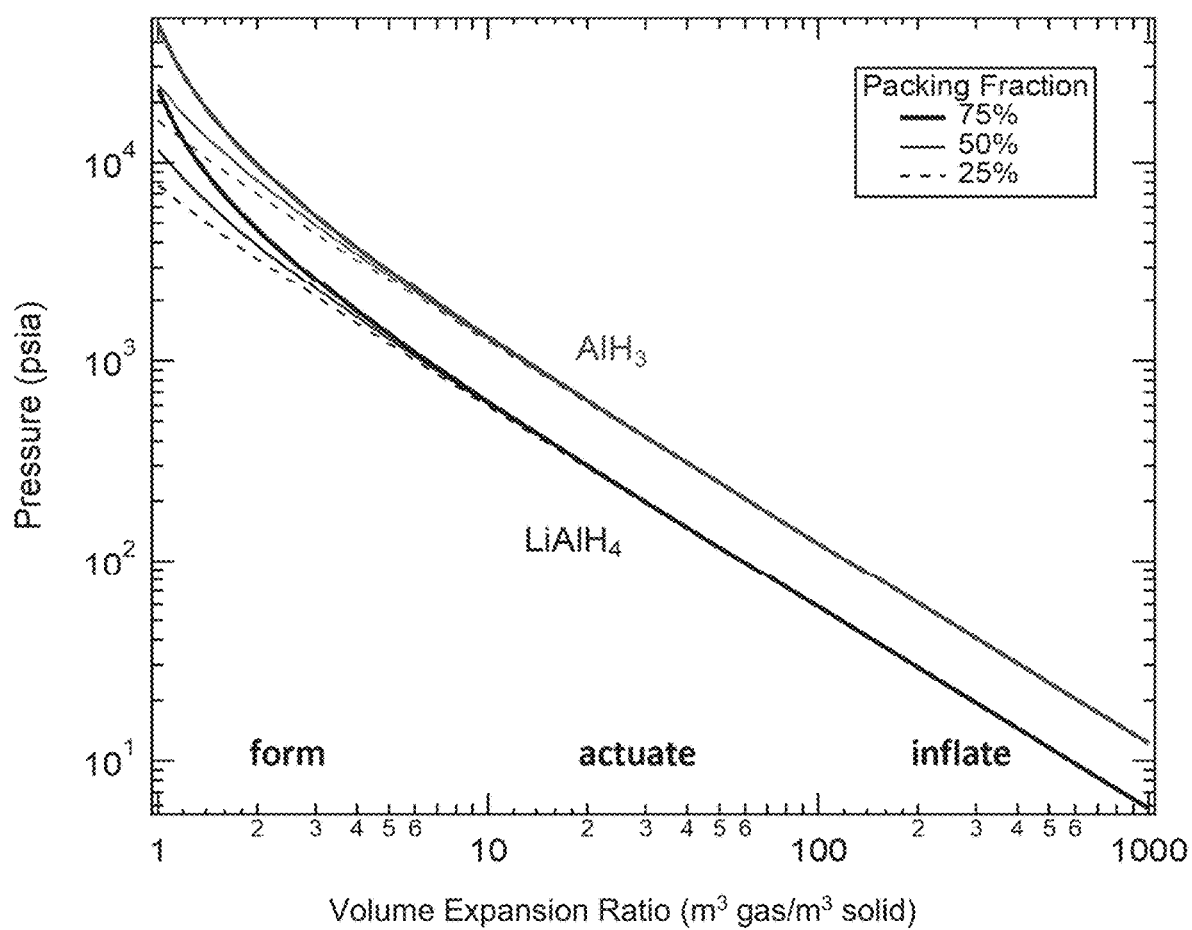
FIG. 3 is a mapping of $H_2$ gas pressures and expansion volumes that can be generated by two different metal hydrides ($AlH_3$ and $LiAlH_4$), which can be matched to different use regimes (cases), including inflation (requiring a high volume of $H_2$ gas at low pressure), actuation (requiring moderate volume of $H_2$ gas at moderate pressure), and forming (e.g., plastic deforming, requiring a low volume of $H_2$ gas at high pressure).

Further, the hydride material may be provided at any suitable packing density to achieve various types of work, as desired for deployment of the structure. For example, the packing density may be between about 20% to about 90% (e.g., of the bulk volume of the hydride material). FIG. 3 is a mapping of $H_2$ gas pressures and expansion volumes that can be generated by two different metal hydrides ($AlH_3$ and $LiAlH_4$), which can be matched to different use regimes (cases), including inflation (requiring a high volume of $H_2$ gas at low pressure), actuation (requiring moderate volume of $H_2$ gas at moderate pressure), and forming (e.g., plastic deforming, requiring a low volume of $H_2$ gas at high pressure). The pressure mappings appear generally independent of powder packing within lower pressure regimes, but are shown to diverge in the high pressure forming regime, with higher packing fractions providing higher positive pressure deviations at smaller volumes. Those having ordinary skill in the art are capable of selecting suitable packing densities and amounts, depending on the type of work desired.

Sheet Material

The sheet material forms the outer boundary or perimeter of the deployable structure, and acts as a non-rigid container for the hydride material and/or hydrogen gas. The sheet material may be a single layer formed of a single material (e.g., may have a single-layer structure), or may have multiple layers formed of differing materials that are fused or laminated together (e.g., may have a multi-layer structure). The material(s) may be selected so that the sheet material has suitable characteristics, which may simultaneously include: impermeability to $H_2$ diffusion, the ability to hold (withstand) the pressure applied by the $H_2$ without rupturing, and the ability to plastically deform in response to the pressure. The sheet material may include a pressure holding layer, a plastic deformation layer outside the pressure holding layer, and an optional hydrogen barrier layer inside the plastic deformation layer. Here, the term "inside" refers to the side of the sheet material that faces and/or is closer to the hydride material and $H_2$ gas, while the term "outside" refers to the opposite-facing side that is farther from the hydride material and $H_2$ gas.

Figure 4A:
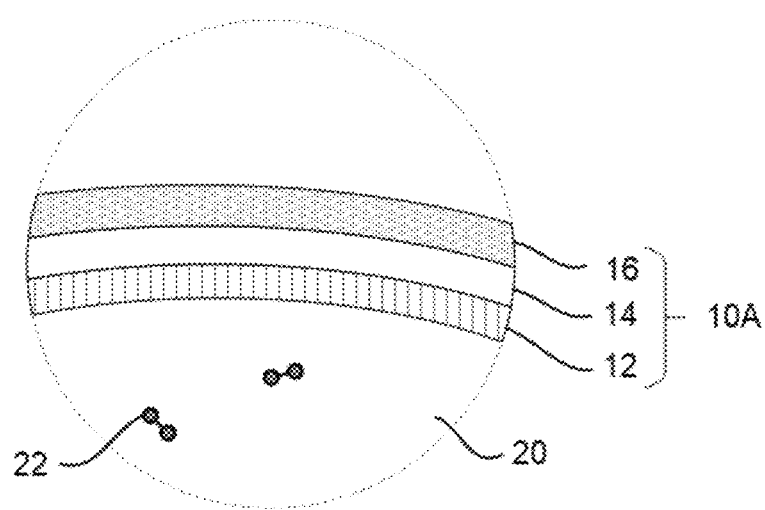
FIGS. 4A and 4B are schematic cross-sectional diagrams, each showing a multi-layer sheet material according to embodiments of the present disclosure.
Figure 4B:
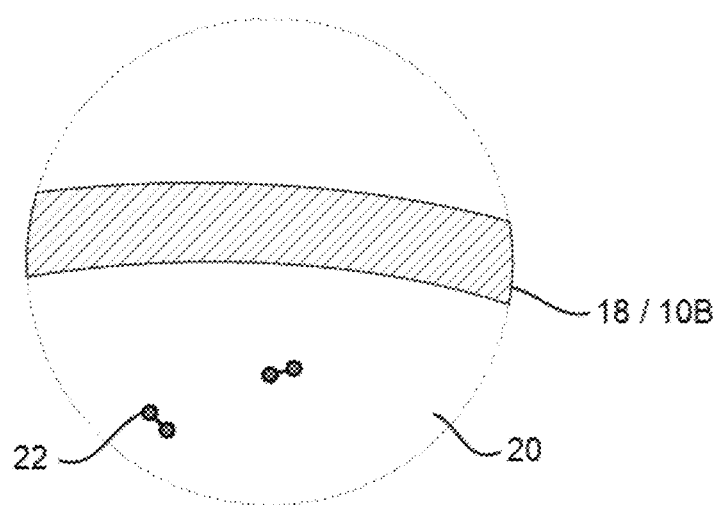

FIGS. 4A and 4B are schematic cross-sectional diagrams, each showing a multi-layer sheet material according to embodiments of the present disclosure. In some embodiments, as shown in FIG. 4A, the sheet material 10A serves as an outer boundary for a cavity 20 filled with hydrogen gas 22, and includes a hydrogen barrier layer 12, a pressure holding layer 14, and a plastic deformation layer 16. Here, although the layers are separately named and identified with their primary characteristics or functions, it will be understood that when the sheet material includes multiple layers, each layer may possess multiple characteristics or serve multiple functions (albeit to different degrees). Therefore, for example, an outermost layer termed a plastic deformation layer 16 may also have some pressure holding ability. In the embodiment shown in FIG. 4A, the hydrogen barrier layer 12, the pressure holding layer 14, and the plastic deformation layer 16 are stacked in order from the inside to the outside (e.g., innermost to outermost layer); however, embodiments of the present disclosure are not limited thereto. In some embodiments, two or more layers selected from among the hydrogen barrier layer, the pressure holding layer, and the plastic deformation layer may be integrated as a single (e.g., the same) layer. For example, as shown in FIG. 4B, the sheet material 10B has a single layer 18 that simultaneously carries out the combined functions of two or more of the layers 12, 14, or 16 in FIG. 4A.

The plastic deformation layer 16 may be formed of any suitable material that is plastically deformed under the range of applied $H_2$ pressures. In some embodiments, the plastic deformation layer 16 may include or be formed of a metal. The metal may include aluminum (Al), titanium (Ti), iron (Fe), copper (Cu), beryllium (Be), magnesium (Mg), nickel (Ni), or an alloy or mixture of any thereof. For example, the plastic deformation layer 16 may include a steel alloy (including Fe), a Ti alloy, a LiAl alloy, and/or a Ni super alloy (such as Inconel). In some embodiments, the plastic deformation layer 16 may include or consist of an Al alloy (e.g., a 1000, 2000, 3000, 5000, 6000, 7000, or 8000 series alloy) or Al metal.

In some embodiments, the plastic deformation layer may include or be formed of a composite material including a resin and a fiber. The plastic deformation layer may include or be formed of a thermoplastic-fiber composite, a thermoset-fiber composite, and/or a b-staged thermosetting composite. Any suitable composites available in the art in these categories may be used.

Non-limiting examples of the thermoplastic-fiber composite may include glass, carbon, and/or aramid fibers in combination with a thermoplastic polymer such as polypropylene (PP), polyethylene (PE), acrylonitrile-butadiene-styrene (ABS), polyvinyl chloride (PVC), polyamide (PA, nylon), polycarbonate, polymethyl(meth)acrylate (PMMA), perfluoroalkoxy alkanes (PFA), polytetrafluoroethylene (PTFE), polyetherimide (PEI), poly(ether ketone ketone) (PEKK) and/or poly(ether ketone) (PEEK).

Non-limiting examples of the thermoset-fiber composite may include glass, carbon, and/or aramid fibers in combination with a thermosetting polymer such as polyurethane, polyimide, cyanate ester, vinyl ester, bismaleimide (BMI), and epoxy-based resin.

As used herein, the term "b-staged thermosetting composite" may refer to a composite with a thermosetting resin that is initially provided in a partially cured thermoplastic state ("b-stage" state), and is fully cross-linked and cured (to a "c-stage") at the time of deployment, for example, after the sheet material is inflated and formed. The b-staged thermosetting composite may be selected to have a curing rate that is slower than the pressurization rate so that curing occurs after final form achieved. Non-limiting examples of the b-staged thermosetting composite may include glass, carbon, and/or aramid fibers in combination with a thermosetting polymer such as those described above.

The material of the plastic deformation layer 16 (e.g., the composite material and/or alloy used to form the layer) may be selected to have substantially zero thermal expansion (e.g., when the thermal expansion of the fiber compensates for that of the resin), and in some embodiments a high radiation threshold, as appropriate for space applications.

Certain metals may be embrittled or may form hydrides upon exposure to $H_2$, and the rate of such reactions may be increased in the presence of elevated temperatures and/or $H_2$ pressures. Such hydrogen embrittlement (e.g., hydrogen assisted cracking) and/or hydride formation in the sheet material may contribute to unwanted changes in the properties of the material, and/or structural failure. Accordingly, when the plastic deformation layer 16 includes a metal that is vulnerable to $H_2$ embrittlement or hydride formation (e.g., a metal other than Al), an intermediate layer (e.g., hydrogen barrier layer) should be placed between the plastic deformation layer 16 and the cavity 20 to protect the plastic deformation layer 16 from contact with hydrogen gas 22. In some embodiments, for example, the plastic deformation layer 16 is the outermost layer, and is separated from the cavity by the hydrogen barrier layer 12.

The hydrogen barrier layer 12 may be formed of any material that is substantially impermeable to, and does not react with $H_2$. The hydrogen barrier layer is substantially continuous with respect to the sheet material 10A, and as discussed above, functions to protect the plastic deformation layer 16 from contact with $H_2$. In some embodiments, the hydrogen barrier layer 12 includes a substantially continuous aluminum layer or coating.

Al is notably resistant to $H_2$ embrittlement. Accordingly, in embodiments where the plastic deformation layer 16 substantially includes Al or any $H_2$-resistant metal, the hydrogen barrier layer 12 may be omitted. Further, in embodiments where the plastic deformation layer 16 substantially includes or consists of Al, an Al sheet may be used as the single layer 18, and may act as a combined (integrated) pressure holding layer 14 and plastic deformation layer 16. For example, in some embodiments the sheet material includes an aluminum film as the pressure holding layer and the plastic deformation layer (combined functions), and the hydrogen barrier layer is omitted.

The pressure holding layer 14 may strengthen the sheet material 10A against rupture during pressurization, and may thereby increase the holding (pressure) capacity of the structure. The pressure holding layer 14 may aid in creation of a closed balloon structure (e.g., closed perimeter), and as such, the material may be selected to provide a relatively high bond strength at joints or sealed edges of the sheet material in order to prevent or reduce bond failure stress, including at the temperatures used during device deployment and sheet material forming. Further, the pressure holding layer 14 may enable use of the b-staged thermosetting composite in the plastic deformation layer 16, for example by allowing the sheet material to be pressurized before the b-staged thermosetting composite is cured.

Bond failure stress may be expected to occur primarily in edge regions of the device where the sheet material is sealed and bonded to form an encapsulating structure, but may also occur within the sheet (e.g., away from a bond). The amount of bond failure stress applied to such regions is directly and proportionally related to the pressure induced by $H_2$ against the sheet material, as well as the diameter/thickness of the sheet material. Accordingly, both the materials and the thicknesses of layers may be selected so that the amount of bond failure stress is greater than the yield stress but less than the failure stress of the sheet material and its constituent layers.

In some embodiments, the pressure holding layer may include a polymer material having a high resistance to bond failure. Non-limiting examples of the polymer may include polypropylene (PP), polyethylene (PE), acrylonitrile-butadiene-styrene (ABS), polyvinyl chloride (PVC), polyamide (PA, nylon), polycarbonate, polymethyl(meth)acrylate (PMMA), perfluoroalkoxy alkane (PFA), polytetrafluoroethylene (PTFE), polyetherimide (PEI), poly(ether ketone ketone) (PEKK), poly(ether ether ketone) (PEEK), and mixtures thereof.

When the hydrogen barrier layer 12 is included, the hydrogen barrier layer 12 may be inside the pressure holding layer 14 or vice versa, as long as the plastic deformation layer 16 is outside both.

In some embodiments, the temperature at which the hydride is converted into hydrogen gas is matched with a plastic deformation or glass transition temperature of the plastic deformation layer 16. That is, the plastic deformation layer 16 may be selected to have a plastic deformation or glass transition temperature similar to the temperature that would be applied to the hydride material to trigger $H_2$ release (e.g., within about ±20° C., about ±15° C., about +10° C., or about +5° C., or for example, comparatively lower by about 20° C., 15° C., 10° C., or 5° C.), such that the applied heat would simultaneously facilitate $H_2$ release and plastic deformation of the sheet material. In some embodiments, a similar criterion may be applied to selection of the polymer in the pressure holding layer 14.

The constituting layers of the sheet material 10A or 10B may each have a minimum thickness of equal to or greater than 100 nm. The maximum thickness of each layer may be constrained by the desired yield stress of the sheet material. That is, the maximum thickness of each layer should be resistant to rupture but still allow for plastic deformation of the sheet material, as determined by the force achievable by the hydrogen gas within the deployed volume. Those having ordinary skill in the art are capable of determining suitable thickness ranges for each layer and for the sheet material as a whole.

The constituting layers of the sheet material 10A or 10B may be fabricated utilizing any suitable method. For example, the hydrogen barrier layer 12 (when present) and the plastic deformation layer 16 (when formed of a metal) may each independently be formed by sputtering, PVD, CVD, electroplating, or as a pressed on sheet, depending on the desired thickness. As another example, the pressure holding layer 14 (when present) may be formed by dip-coating, spin coating, spraying, or as a pressed on sheet, and the plastic deformation layer 16 (when formed of a resin composite) may be formed as a pressed on sheet. In some embodiments, when the sheet material 10A includes multiple layers, the layers may be arranged so that they are graded at the edges, thus facilitating bonding between like materials for each layer.

H$_2$ Release Triggers

In some embodiments, the deployable structure may further include a trigger to initiate conversion of the hydride material to hydrogen gas. The trigger may be or include at least one selected from a thermal trigger, a chemical trigger, an electrical trigger, and a microwave trigger, each in contact with the hydride material.

The thermal trigger may be any suitable means for generating and/or applying heat to the hydride material (e.g., to overcome a reaction barrier or provide energy input for an endothermic reaction). The thermal trigger may include a single heat source or a combination of heat sources. In some embodiments, the thermal trigger may include a film (thin-film) heater. The film heater may have a thickness of less than or equal to about 1 mm (for example, about 0.4 mm to about 1 mm) and may be integrated (e.g., laminated) with the sheet material. In some embodiments, the film heater may be part of the pressure holding layer 14 polymer film, or in some embodiments, the film heater may be attached to the outside of the sheet material (e.g., over the plastic deformation layer 16). Any suitable film heater may be used. For example, the film heater may be formed of polyimide encased in Kapton and/or silicone.

In some embodiments, the thermal trigger may include a low-emissivity heat-generating coating on a surface (e.g., at least a portion of the outside surface) of the sheet material. When infrared (IR) radiation produced by an IR radiation source is incident on the heat-generating coating, heat may be generated and applied to the hydride material. The IR radiation source may be or include an IR lamp and/or the sun. When the device is deployed in low-earth orbit, IR radiation from the sun may be reflected from the earth's surface to the heat-generating coating.

In some embodiments, the chemical trigger may include a reagent that initially reacts with or destabilizes the hydride material. In some embodiments, for example in terrestrial use cases, the chemical trigger may be water, and H$_2$ gas may be released via hydrolysis when the hydride material is exposed to the water.

The electrical trigger may be any suitable means for generating and/or applying current to the hydride material. In some embodiments, the electrical trigger may include a circuit for applying current to the hydride material bed, such that the hydrides are electrochemically decomposed.

In some embodiments, the microwave trigger may include a microwave source.

Sheet Material Bonding and Device Examples

The sheet material 10A or 10B described herein may be formed into devices having various suitable shapes and cross-sections. Selected examples are provided herein, but it will be understood that embodiments of the present disclosure are not limited thereto.

Figure 5:
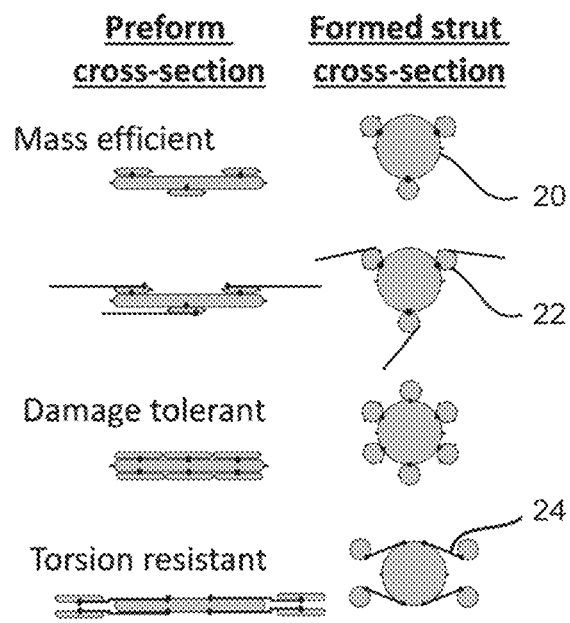
FIG. 5 is a schematic diagram showing a selection of preforms (devices pre-inflation) and their associated inflated (e.g., final) cross-sections.

In one example, a rectangular sheet material may be folded over on itself so that two parallel sides can be joined, bonded, and sealed, thereby forming a tube (tubular structure). After the hydride material is inserted within the cavity of the tube, the tube can be sealed at both ends. FIG. 5 is a schematic diagram showing a selection of preforms (devices pre-inflation) composed of a larger central tube 20 that is symmetrically surrounded by smaller tubes 22 and/or sheets/tethers 24. Prior to inflation, the tubes 20 and 22 are relatively flat and compressed. Inflation of the structures generates hoop (tangential) stress to plastically deform the tubes so that each has a cylindrical (circular) cross-section.

For example, the amount of generated H$_2$ pressure is configured so that the system conforms to the following Equation 1:

$$\sigma_{yield} < P\, r/t < \sigma_{ult}, \qquad \text{Equation 1}$$

where $\sigma_{yield}$ and $\sigma_{ult}$ are the sheet material yield and ultimate stress, P is the H$_2$ pressure, r is the tube radius, and t is the sheet material thickness.

The cross-sections may be designed and selected to have various suitable characteristics, such as mass efficiency, damage tolerance, and torsion resistance (as labeled) when the structures are used, for example, as struts. Those having ordinary skill in the art are capable of designing other tube-derived cross-sections and combinations to provide suitable results.

Figure 6:
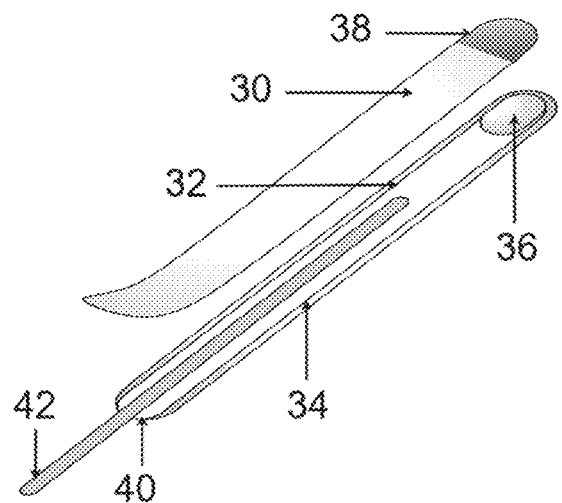
FIG. 6 is a schematic diagram showing assembly of a preform composed of two oblong pieces of sheet material bonded together at their edges.

In another example, two flat pieces of sheet material can be matched and bonded around their congruent perimeters. The sheet material may thus form a structure similar to a mylar balloon. FIG. 6 is a schematic diagram showing assembly of a preform composed of two oblong pieces of sheet material 30. A high-temperature mask 32 is optionally included to span the central areas of the sheet material 30 so that these regions are not bonded together. The edges 34 of the sheet material 30 are unmasked, and thus able to be bonded. Here, the long edges of the preform are depicted as being straight, which provides enhanced structural stability along that portion of the device. In this depicted embodiment, an internal preform 36 is inserted at the far end 38 of the device (opposite the end temporarily left open for hydride insertion 40) to stiffen the end of the structure and to facilitate end-to-end joining of multiple devices, e.g., by brazing. The hydride insertion end 40 can be sealed once the hydride 42 is fully inserted. Finally, the flat pre-form can be rolled up, perpendicular or normal to its long axis, for compact storage prior to deployment.

In another example, multiple (e.g., more than two) pieces of sheet material can be matched and bonded to form more complicated three-dimensional shapes. For example, three rectangular sheets can be bonded along their long edges to form a tube or prism with a substantially triangular or Reuleaux-trianglular cross-section, and four rectangular sheets can be similarly bonded to form a tube with a substantially rectangular, square, or Reuleaux-square cross-section. In some embodiments, the sheets may be manufactured with gradient thicknesses so that the sides are substantially flat after inflation (e.g., instead of being curved). For example, calculations of the bending moment of inertia difference can be used to predict sheet thicknesses or geometries that would result in particular structures. Sheets of different thicknesses, which resist pressure differently, may be combined to design and form different final cross-sections.

The sheet material pieces may be bonded using any suitable method, including roll bonding (hot rolling), laser welding, an adhesive resin, etc. When heat is used to achieve bonding, the heat-affected zone should be minimized to avoid prematurely heating the hydride material. In some embodiments, an additional clamp may be applied to reinforce the seal.

In some embodiments, the deployable structure may further include a female die surrounding the sheet material to determine one or more contours of the sheet material after inflation. Those having ordinary skill in the art are capable of selecting suitable die designs for the intended structure. However, other embodiments of the present disclosure provide for die-less forming of feature-rich structures, as described herein.

In some embodiments, for example when the hydride material is a reversible hydride, the deployable device may further include a valve and/or a secondary containment structure to spatially separate the hydride material from released hydrogen gas. For example, the hydride material may be contained in a packet or bag equipped with a one way gas valve before being placed in the cavity of the sheet material. Such separation would interrupt the equilibrium between the hydride materials and $H_2$, such that reducing the temperature applied to the device would not result in reformation of the hydride and loss of $H_2$ pressure. Accordingly, the structure could remain deployed without continued heat input as a trigger.

Figure 7:
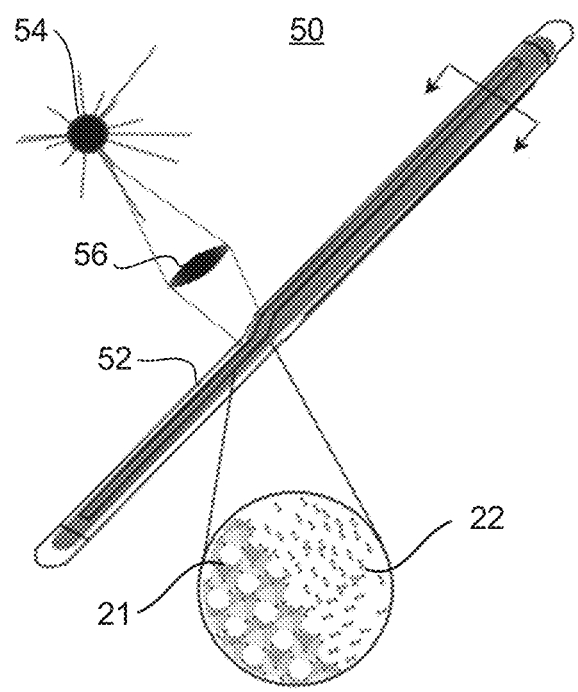
FIG. 7 is a schematic diagram showing an example structure in the process of being plastically deformed (inflated) from its initial flat state (lower left portion) to a deployed tubular state (upper right portion).

FIG. 7 is a schematic diagram showing an example structure 50 in the process of being plastically deformed (inflated) from its initial flat state (lower left portion) to a deployed tubular state (upper right portion). The embodiment of structure 50 includes, as a thermal trigger, a low-emissivity heat-generating coating 52 on its outside surface. IR radiation generated by the sun 54 is focused onto the coating via an optical system (lens) 56, and heat subsequently generated by the coating 52 results in solar-thermal actuation of the hydride material 21 to release hydrogen gas 22.

Method of Deploying the Structure

Figure 8:
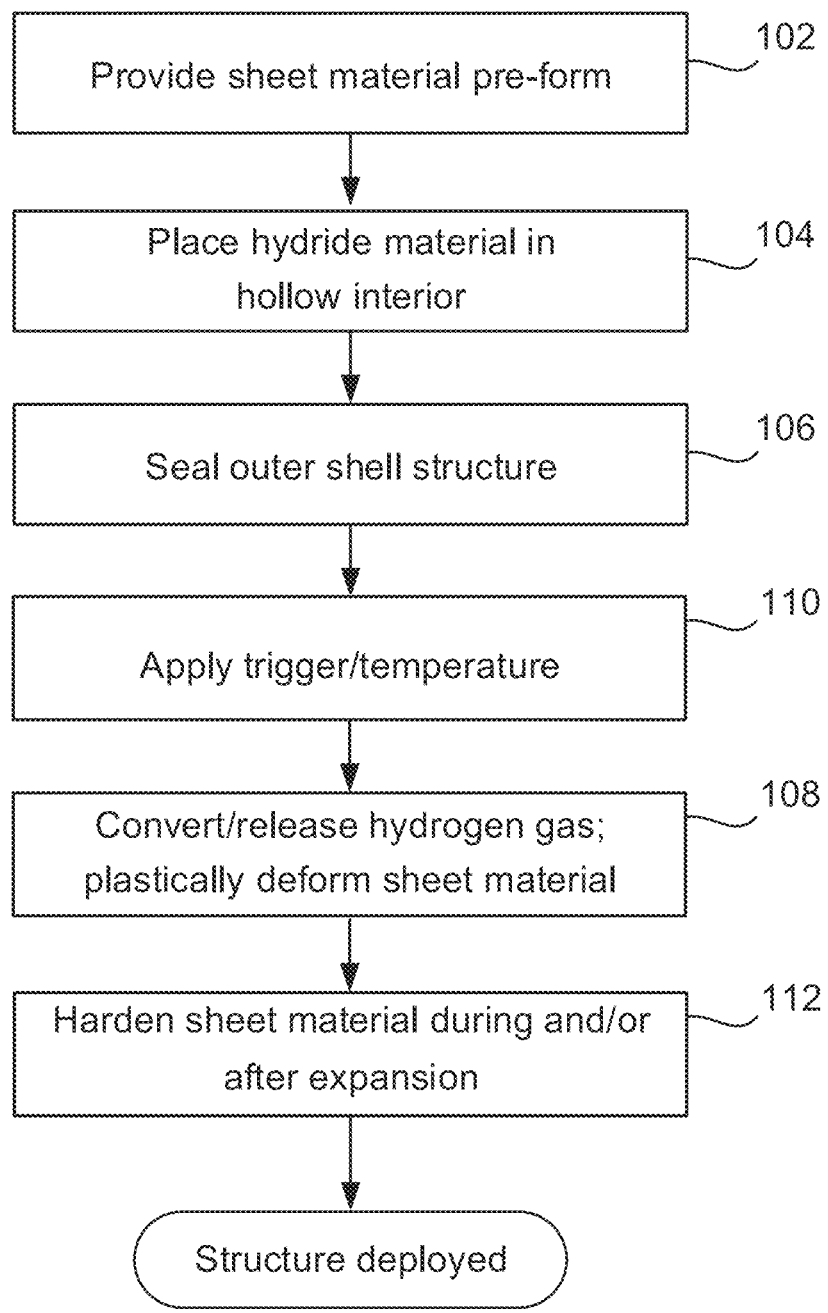
FIG. 8 is a flowchart diagram illustrating a method of expanding (deploying) a structure utilizing a hydride material according to embodiments of the present disclosure.

One or more aspects of embodiments of the present disclosure provide for a method of expanding (deploying) a structure utilizing a hydride material, illustrated in the flowchart diagram of FIG. 8. The method 100 includes the acts or active steps of: providing a sheet material including an outer shell structure and a hollow interior (102); placing a hydride material to be (e.g., capable of being) converted into hydrogen gas into the hollow interior of the sheet material (104); sealing the outer shell structure (106); and converting and releasing the hydrogen gas to expand and plastically deform the sheet material (108). The sheet material, hydride material, and overall form of the structure may be the same as described above.

In some embodiments, the method may further include the act of applying a trigger to the hydride material (110) to release the hydrogen gas. The trigger may be the same as described above. In some embodiments, the trigger may be a thermal trigger, and the act of applying the trigger may include applying heat to the hydride material at a temperature of about 40° C. to about 500° C. The act of applying the trigger may be continuous or pulsed (intermittent), and may be constant or varied over the described temperature range, as desired to control the rate, time frame, and total pressure of hydrogen gas release.

In some embodiments, the hydride material includes a reversible hydride, and the act 108 of converting and releasing the hydrogen gas is reversible (e.g., the hydrogen gas can be at least partially recaptured by the reverse reaction involving back-conversion of hydrogen gas to the hydride material). The reverse reaction may be triggered by controlling or modifying the temperature of the device. For example, when the hydride material releases $H_2$ via an endothermic reaction, the reverse reaction may be triggered by lowering the temperature applied to the hydride material. In some embodiments, the hydride material includes an irreversible hydride, and the act 108 of converting and releasing the hydrogen gas is irreversible (e.g., proceeds by a substantially irreversible reaction).

In some embodiments, for example when the sheet material includes the thermosetting composite or the b-stage thermosetting composite as discussed above, the act of plastically forming the sheet material may further include hardening the sheet material during and/or after the expansion (112). Accordingly, the act of converting and releasing the hydrogen gas may be configured to occur prior to or at a faster rate than the act of hardening the sheet material. For example, the reaction to release hydrogen gas may be substantially (e.g., greater than 90%, 95%, or 99%) complete before the corresponding thermosetting composite is substantially (e.g., greater than 90%, 95%, or 99%) cured. In some embodiments, for example, the hydride material and the thermosetting composite or the b-stage thermosetting composite may be selected so that $H_2$ release by the hydride material is triggered at a lower temperature than the thermosetting reaction, and at least a portion of total available $H_2$ may be released at the lower temperature before the system temperature is raised to the temperature at which thermosetting is trigged. Those having ordinary skill in the art are capable of selecting suitable materials and controlling the system temperature in order to control the comparative overall rates of reaction.

In some embodiments, the act 108 of converting and releasing the hydrogen gas may be configured to generate a pressure greater than the yield stress of the sheet material and less than the degradation or failure stress of the sheet material.

The following examples and experimental data are provided for illustrative purposes only, and do not limit the scope of the embodiments of the present disclosure.

EXAMPLES

Example 1: High Pressure $H_2$ Generation by LiAlH$_4$

Figure 9:
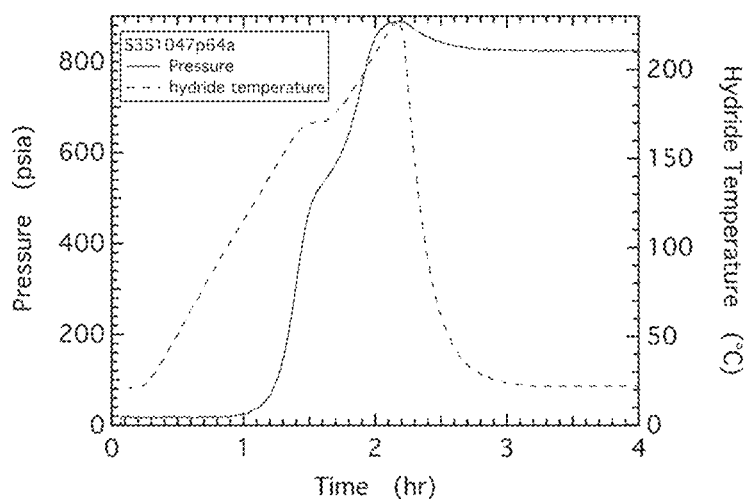
FIG. 9 is a plot showing temperature-controlled release of $H_2$ by $LiAlH_4$ over a period of 4 hours to reach a maximum of 800 psi in that particular test environment.

FIG. 9 is a plot showing temperature-controlled release of $H_2$ by LiAlH$_4$ over a period of 4 hours to reach a maximum of >800 psi in that particular test environment. FIG. 9 thus demonstrates that LiAlH$_4$ (an endothermic metastable hydride) can be used to generate extremely high hydrogen pressures (>20,000 psi) at relatively low temperatures (e.g., about 30° C. to about 200° C.).

Example 2: Temperature-Based Control of $H_2$ Generation by AlH$_3$

Generation of high pressures and expansion volumes is necessary for doing work on a structure (to inflate, actuate or form), but applying that work with precision requires tight control over the evolved pressure. The rate of hydrogen evolution (k(T)) is governed by an Arrhenius relationship with temperature (T), as expressed in the following Equation 2:

$$k(T) = k_0 \exp\left(\frac{-E_a}{RT}\right), \quad \text{Equation 2}$$

where $k_0$ is the rate as $1/T \leftarrow 0$ K, $E_a$ is the activation energy, and R is the gas constant.

Figure 10A:
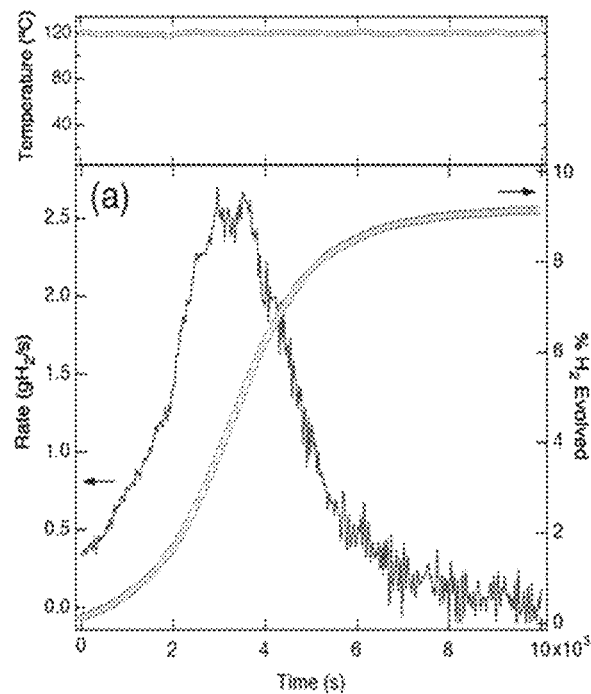
FIGS. 10A and 10B are plots showing rates of $H_2$ generation and the cumulative amount of $H_2$ generated by $AlH_3$ over a test period, as controlled by manipulating the applied temperature.
Figure 10B:
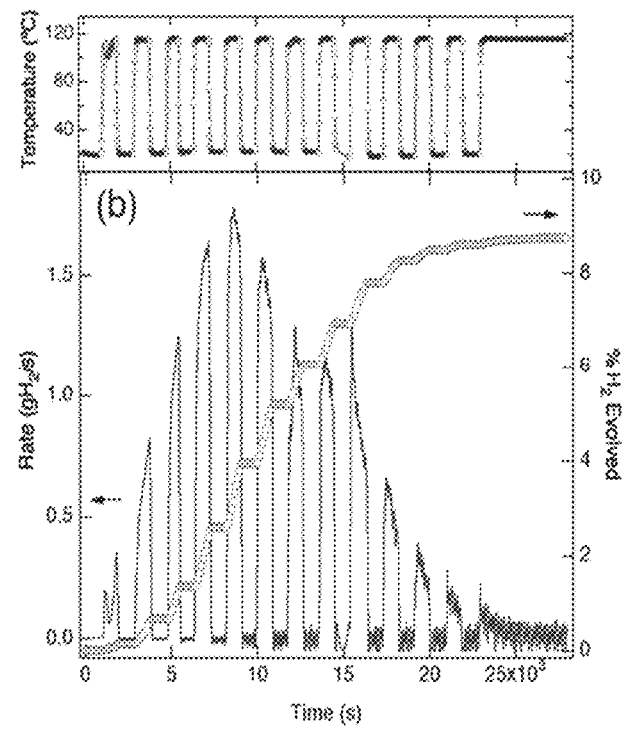

FIGS. 10A and 10B are plots showing that the rate of $H_2$ generation by AlH$_3$ can be controlled by manipulating the applied temperature. FIG. 10A shows that under isothermal control at about 120° C., the sample reaches a peak $H_2$ generation rate of about 2.5 g $H_2$/s for about an hour. In comparison, FIG. 10B shows that under "on/off" (pulsed) temperature control, in which the temperature is rapidly cycled between about 30° C. to about 120° C., the rate of $H_2$ generation is limited to a peak of about 1.8 g $H_2$/s, where the peak spans a longer time period of about 4-5 hours. This plot demonstrates that the rates, time frames, and total amounts of $H_2$ release can be turned "on" and "off" by controlling the temperature over a range of about 100° C. Such fine control would not be possible utilizing other gas-generating chemistries based on e.g., azides or hydrazines.

Example 3: Aluminum-Based Tubular Structure

A self-forming tubular structure (deployable device) was prepared by encapsulating a solid hydride material ($LiAlH_4$) within a plastically deformable sheet material consisting of aluminum foil. The $LiAlH_4$ hydride material was mixed with 3 mol % $TiF_3$ catalyst (20 mg total), packed in an aluminum foil envelope (1 cm×3 cm×~1 mm thick), and sealed with Kapton tape to prepare a hydride packet. The packets were prepared in a glove box under argon.

A flat preform was constructed by first rolling 3 layers of a 25 µm thick aluminum foil (75 µm total thickness) into a tube having a length of 20 cm and a diameter of 2.5 cm. The layers were sealed together with a silicone adhesive. The tube was then flattened into a preform having a flat (2 dimensional) initial shape. The flat preform was 20 cm long and 3.9 cm wide with a remaining inside gap of ~1 mm.

Three $LiAlH_4$ hydride packets (total of 60 mg hydride) were inserted into the gap. The number of packets was chosen based on the desired forming volume (~100 cm³) and pressure (slightly greater than 1 bar). The ends of the preform were then sealed with silicone adhesive and clamped to prevent failure of the end seals during forming.

Figure 11:
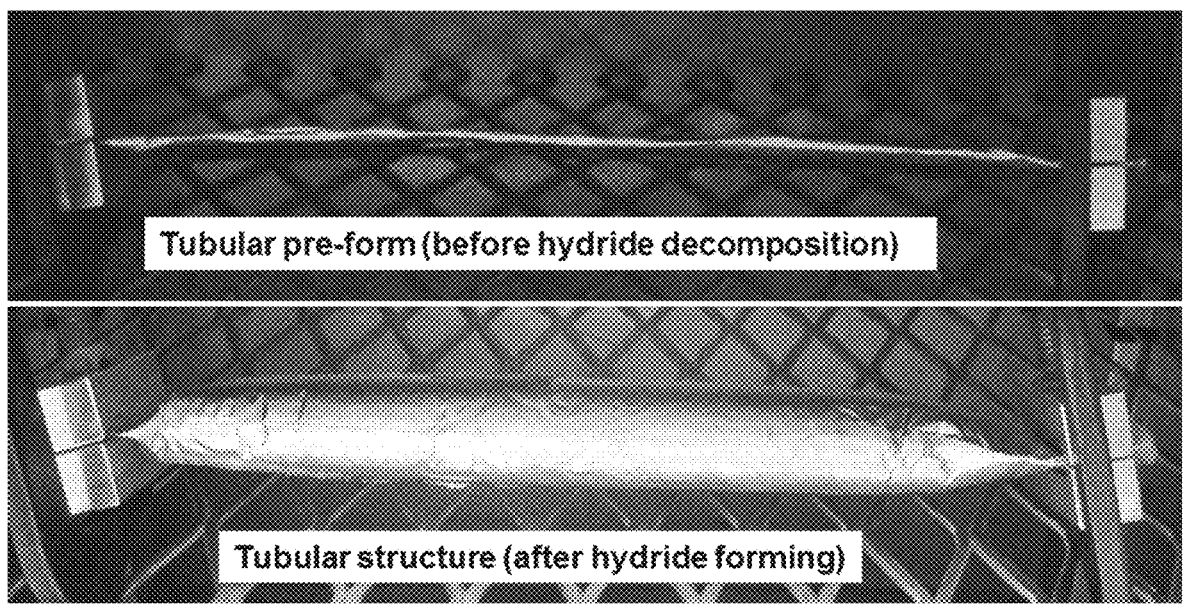
FIG. 11 is a pair of photographic images comparing the flat and compact initial pre-form (upper image) with the inflated (deployed) 3D structure (lower image).

The flat sealed preform was placed in an oven and heated to 230° C. over a period of about 30 minutes. Hydride decomposition (thermolysis) resulting in the evolution of hydrogen gas initiated at ~175° C. and appeared substantially complete by ~220° C. The hydrogen generated from the decomposition reaction produced sufficient pressure to form the initially two-dimensional (2D) flat aluminum structure into a 3D tubular structure. FIG. 11 is a pair of photographic images comparing the flat and compact initial pre-form (upper image) with the inflated (deployed) 3D structure (lower image), demonstrating the successful use of a hydride material to deploy a self-forming structure.

Embodiments of the present disclosure enable the production and use of architectural structures (e.g., beams, struts, and joints) that are highly compact and volume efficient prior to deployment, while also providing intricate thin shell geometries with high flexural rigidity, damage tolerance, and mass efficiency. The replacement of sliding and moving mechanisms with simple inflation and plastic deformation reduces the risk of mechanical failure during deployment. Further, the use of hydride materials as a pressurant provides tight control and at least a 2× advantage in capacity over other gas sources, including compressed gas and hydrazine. Relevant use cases for embodiments of the present disclosure include structures such as solar arrays, antennas, and/or optical systems for use in space applications and environments. In addition, embodiments of the present disclosure could be used in hydrogen powered devices, for example, as part of a hydrogen fuel tank, hydrogen fuel cell, or pressure-based propulsive device.

Terms such as "substantially," "about," and "~" are used as terms of approximation and not as terms of degree, and are intended to account for the inherent deviations in measured or calculated values that would be recognized by those of ordinary skill in the art. They may be inclusive of the stated value and an acceptable range of deviation as determined by one of ordinary skill in the art, considering the limitations and error associated with measurement of that quantity. For example, "about" may refer to one or more standard deviations, or +30%, 20%, 10%, 5% of the stated value.

Numerical ranges disclosed herein include and are intended to disclose all subsumed sub-ranges of the same numerical precision. For example, a range of "1.0 to 10.0" includes all subranges having a minimum value equal to or greater than 1.0 and a maximum value equal to or less than 10.0, such as, for example, 2.4 to 7.6. Applicant therefore reserves the right to amend this specification, including the claims, to expressly recite any sub-range subsumed within the ranges expressly recited herein.

The control device and/or any other relevant devices or components according to embodiments of the present disclosure may be implemented utilizing any suitable hardware, firmware (e.g. an application-specific integrated circuit), software, or combination thereof. For example, various components of the device may be formed on one or more integrated circuit (IC) chips, flexible printed circuit films, tape carrier packages (TCP), printed circuit boards (PCB), etc. Further, various components of the device may be a process or thread, running on one or more processors, in one or more computing devices, executing computer program instructions and interacting with other system components for performing the various functionalities described herein. The computer program instructions may be stored in a standard memory device (such as random access memory (RAM)), and/or in other non-transitory computer readable media (such as a CD-ROM, flash drive, etc.). Various computing device functions may be integrated into a single device, or may be distributed across multiple devices without departing from the scope of the present disclosure.

It will be understood that the disclosure is not limited to the embodiments expressly disclosed herein, and is intended to cover all modifications and equivalent arrangements included within the spirit and scope of the following claims and equivalents thereof.

What is claimed is:

1. A deployable structure comprising:
   a hydride material to be converted into hydrogen gas;
   a sheet material encapsulating the hydride material; and
   a trigger in contact with the hydride material,
   wherein the sheet material has a thickness of 25 µm to 1000 µm and a yield stress,
   the hydride material is to release hydrogen gas in response to the trigger, and
   the hydrogen gas is to generate a pressure greater than the yield stress of the sheet material such that the sheet material is plastically deformed by the hydrogen gas to have an expanded structure, and
   wherein the trigger comprises at least one selected from a thermal trigger comprising a heat source to generate heat, a chemical trigger, and an electrical trigger.

2. The deployable structure of claim 1, wherein the hydride material comprises a reversible hydride.

3. The deployable structure of claim 1, wherein the hydride material comprises an irreversible hydride.

4. The deployable structure of claim 1, wherein the sheet material comprises:
   a pressure holding layer;
   a plastic deformation layer outside the pressure holding layer; and
   an optional hydrogen barrier layer inside the plastic deformation layer.

5. The deployable structure of claim 4, wherein the plastic deformation layer comprises a metal comprising aluminum, titanium, iron, copper, beryllium, magnesium, nickel, or an alloy or mixture of any thereof.

6. The deployable structure of claim 4, wherein the hydrogen barrier layer comprises a substantially continuous aluminum layer or coating.

7. The deployable structure of claim 4, wherein the plastic deformation layer comprises a thermoplastic-fiber composite, a thermoset-fiber composite, and/or a b-staged thermosetting composite.

8. The deployable structure of claim 4, wherein the pressure holding layer comprises a polymer material.

9. The deployable structure of claim 4, wherein a temperature at which the hydride material is to be converted into hydrogen gas is matched with a plastic deformation or glass transition temperature of the plastic deformation layer.

10. The deployable structure of claim 1, wherein the thermal trigger comprises a heat-generating coating on a surface of the sheet material to generate and apply heat to the hydride material to reach a temperature of 120° C. to 500° C.

11. The deployable structure of claim 1, further comprising a female die surrounding the sheet material to determine one or more contours of the sheet material in the expanded structure.

12. A deployable structure comprising:
a hydride material to be converted into hydrogen gas;
a sheet material encapsulating the hydride material; and
a trigger in contact with the hydride material,
wherein the sheet material has a yield stress,
the hydride material is to release hydrogen gas in response to the trigger, and
the hydrogen gas is to generate a pressure greater than the yield stress of the sheet material such that the sheet material is plastically deformed by the hydrogen gas to have an expanded structure, and
wherein the trigger comprises at least one selected from a thermal trigger comprising a heat source to generate heat, a chemical trigger, and an electrical trigger, and
wherein the sheet material consists of a single aluminum foil.

* * * * *